Nov. 4, 1958 — A. R. RODRIGUEZ — 2,858,563
SEAFOOD PROCESSING MACHINES
Filed Aug. 12, 1954 — 9 Sheets-Sheet 1
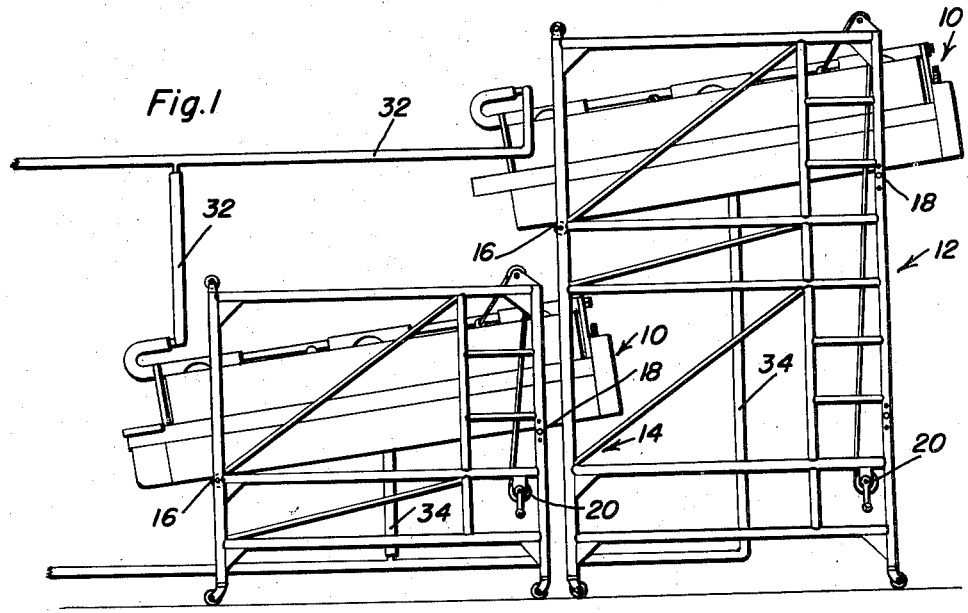
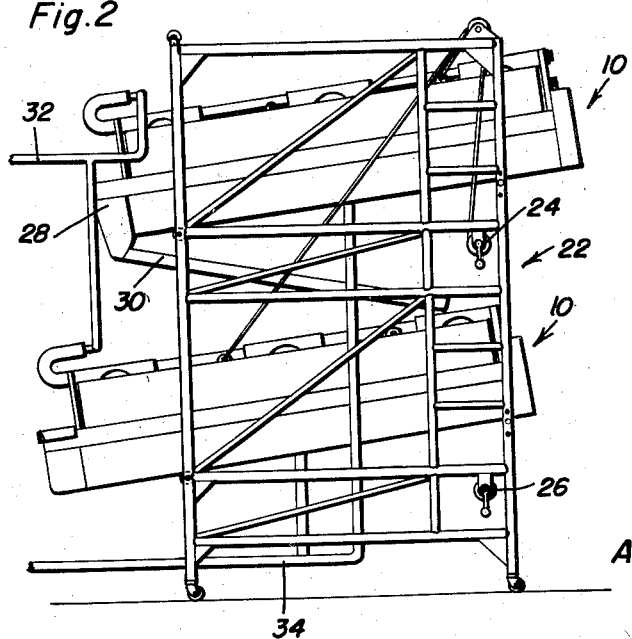
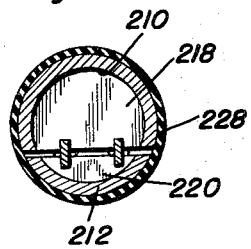
Antoine Rodi Rodriguez
INVENTOR.

Nov. 4, 1958  A. R. RODRIGUEZ  2,858,563
SEAFOOD PROCESSING MACHINES
Filed Aug. 12, 1954  9 Sheets-Sheet 2
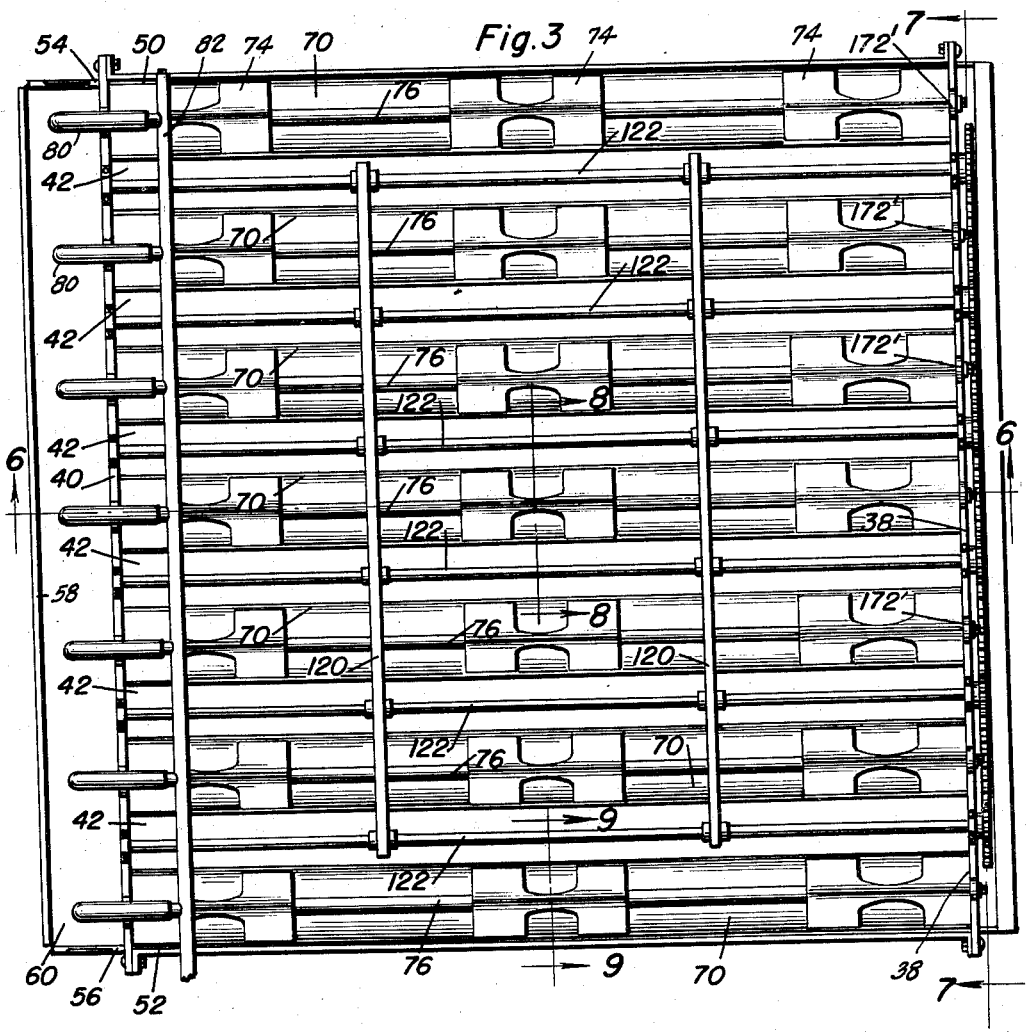
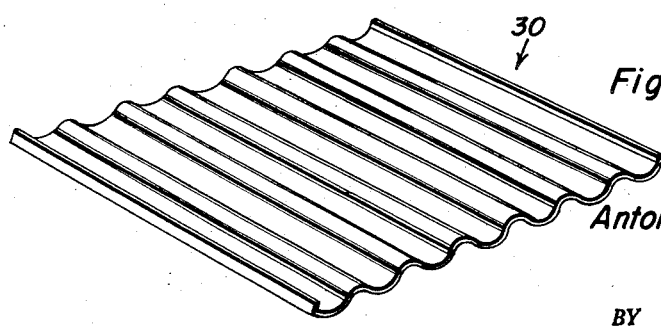
Fig.20
Antoine Rodi Rodriguez
INVENTOR.

Nov. 4, 1958   A. R. RODRIGUEZ   2,858,563
SEAFOOD PROCESSING MACHINES
Filed Aug. 12, 1954   9 Sheets-Sheet 3
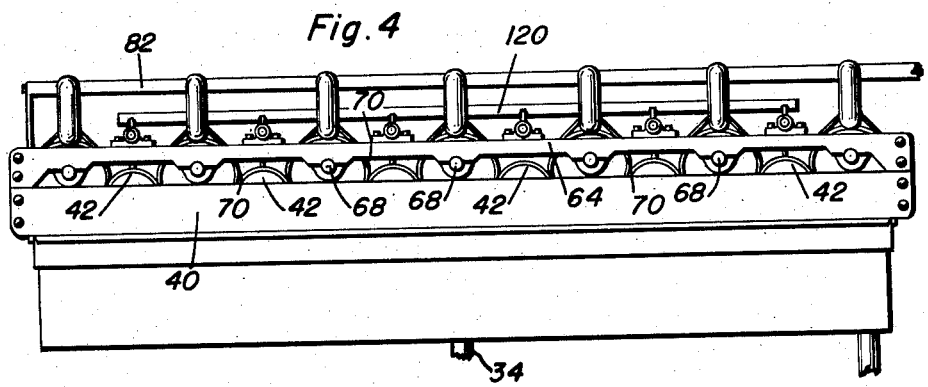
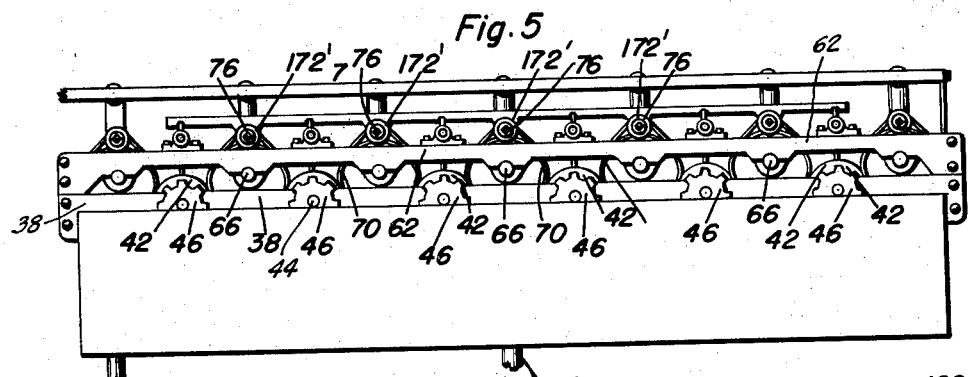
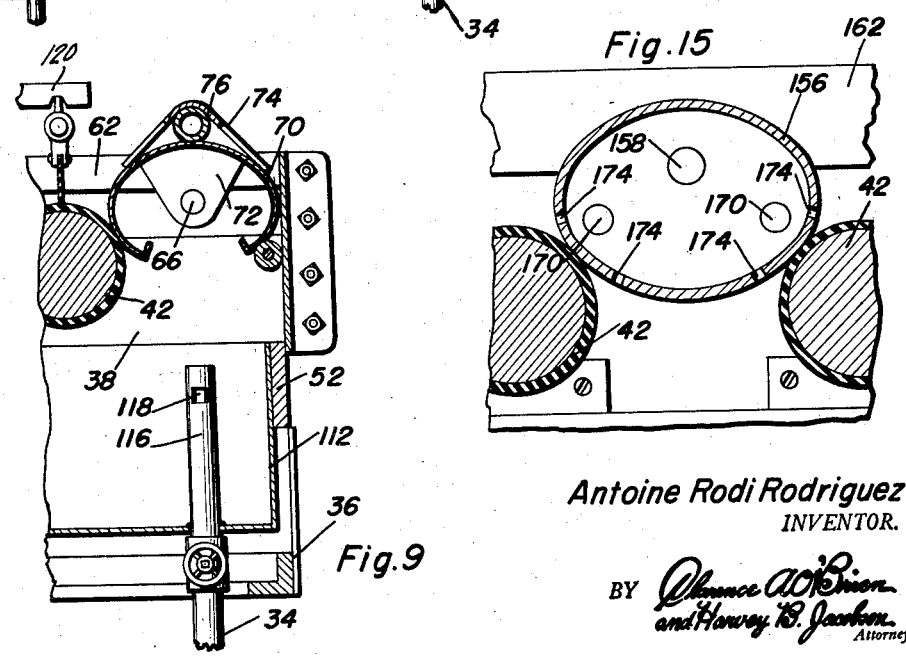
Antoine Rodi Rodriguez
INVENTOR.

Nov. 4, 1958　　A. R. RODRIGUEZ　　2,858,563
SEAFOOD PROCESSING MACHINES
Filed Aug. 12, 1954　　9 Sheets-Sheet 4
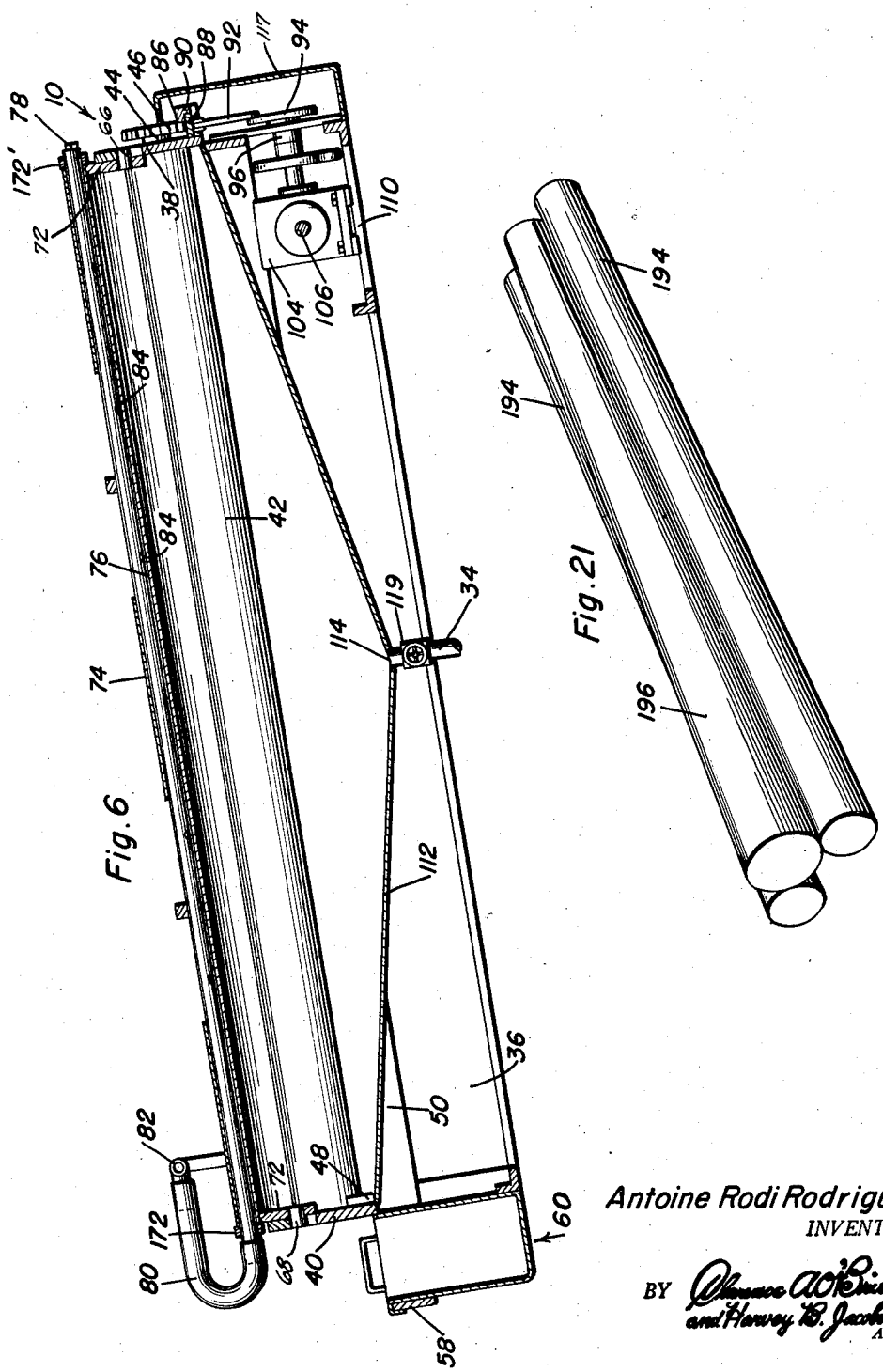
Antoine Rodi Rodriguez
INVENTOR.

Nov. 4, 1958     A. R. RODRIGUEZ     2,858,563
SEAFOOD PROCESSING MACHINES
Filed Aug. 12, 1954     9 Sheets-Sheet 5
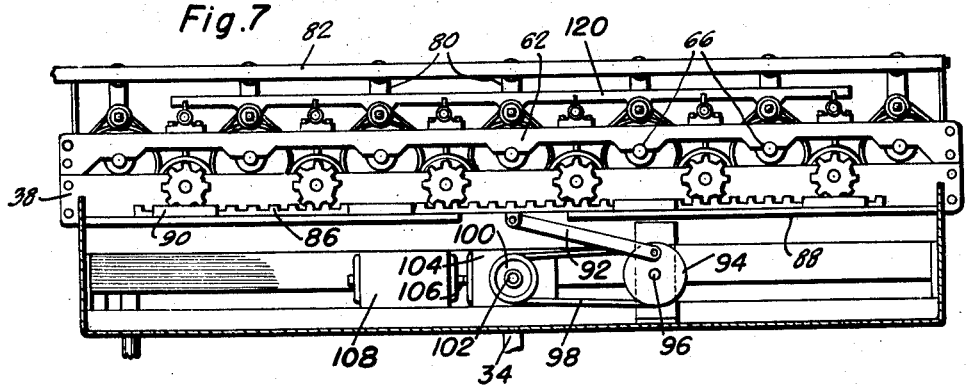
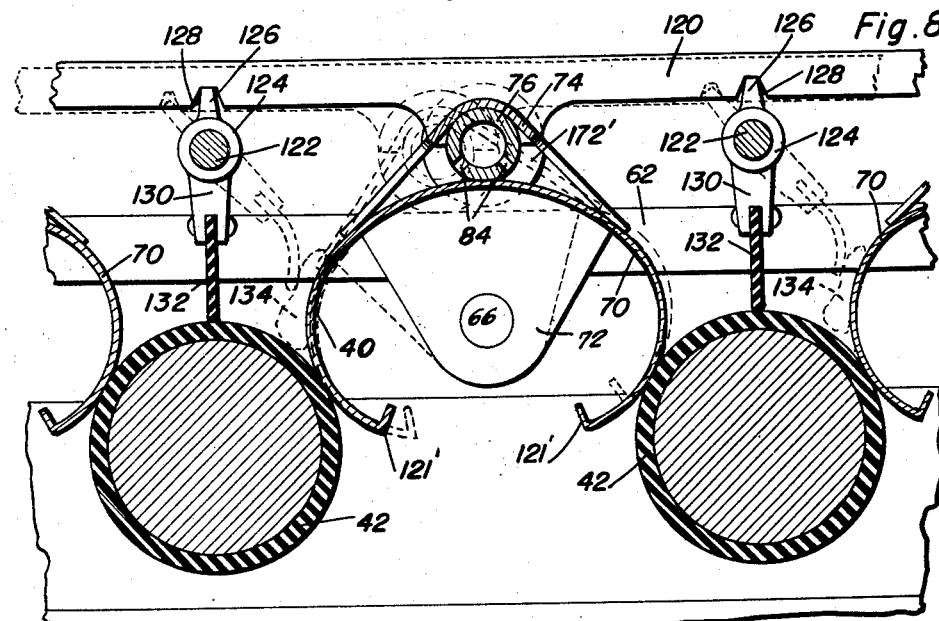
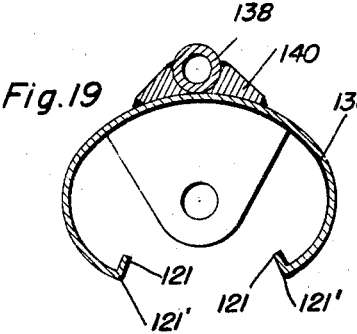
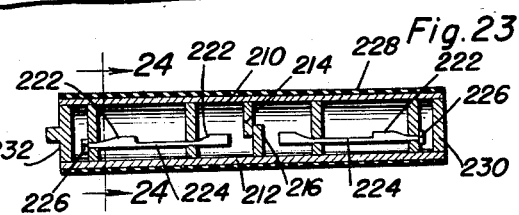
Antoine Rodi Rodriguez
INVENTOR.

Nov. 4, 1958   A. R. RODRIGUEZ   2,858,563
SEAFOOD PROCESSING MACHINES
Filed Aug. 12, 1954   9 Sheets-Sheet 6
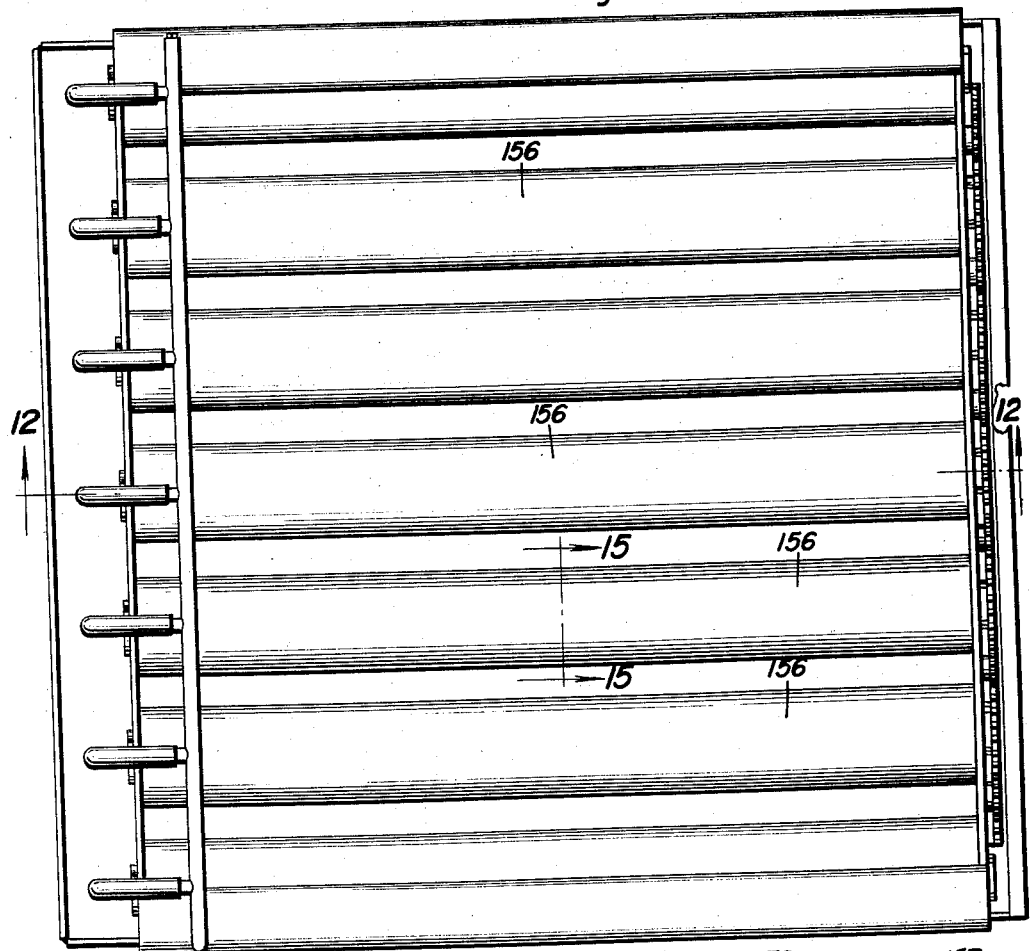
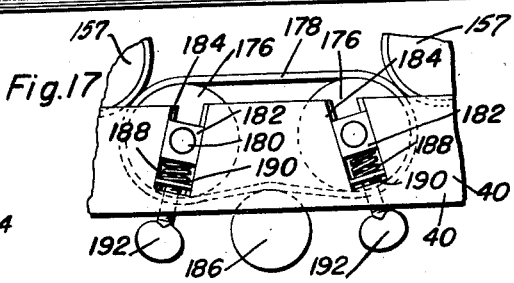
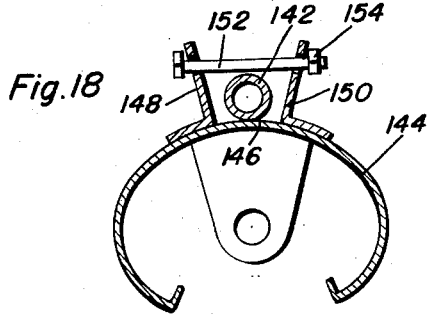
Antoine Rodi Rodriguez
INVENTOR.

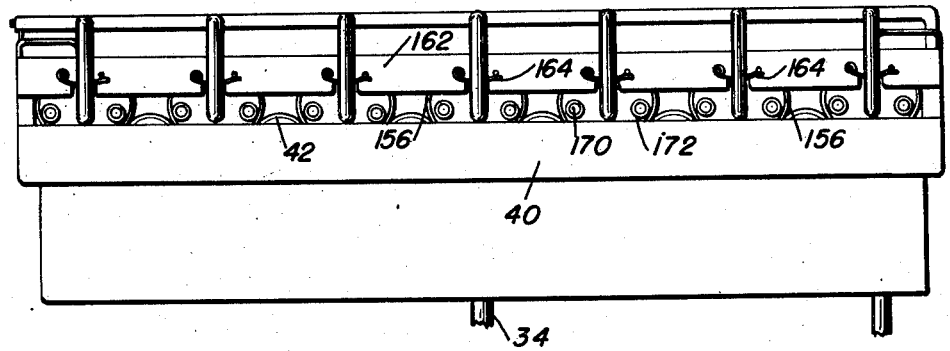
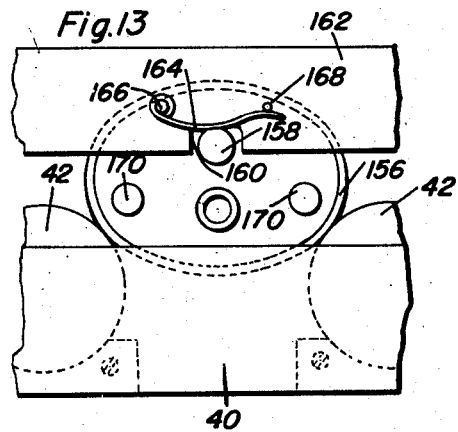
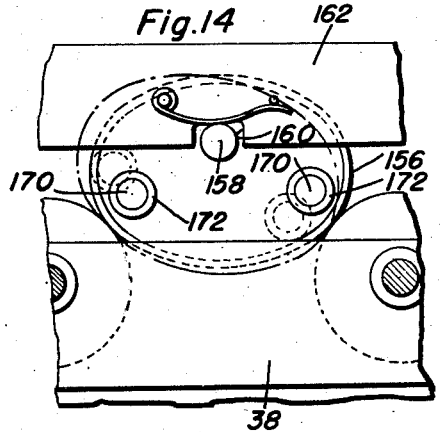
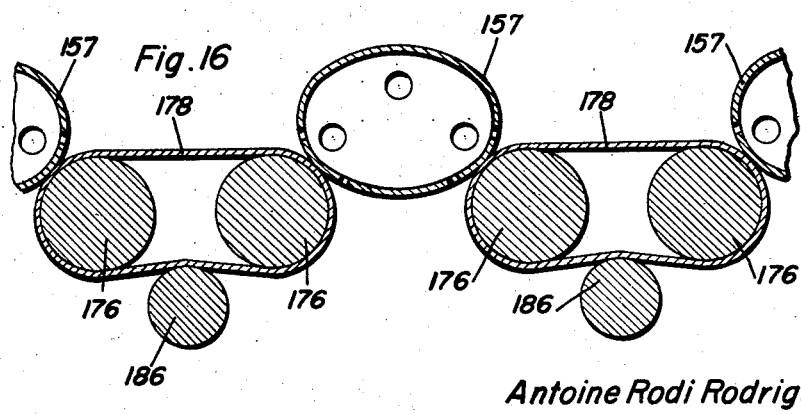
Antoine Rodi Rodriguez
INVENTOR.

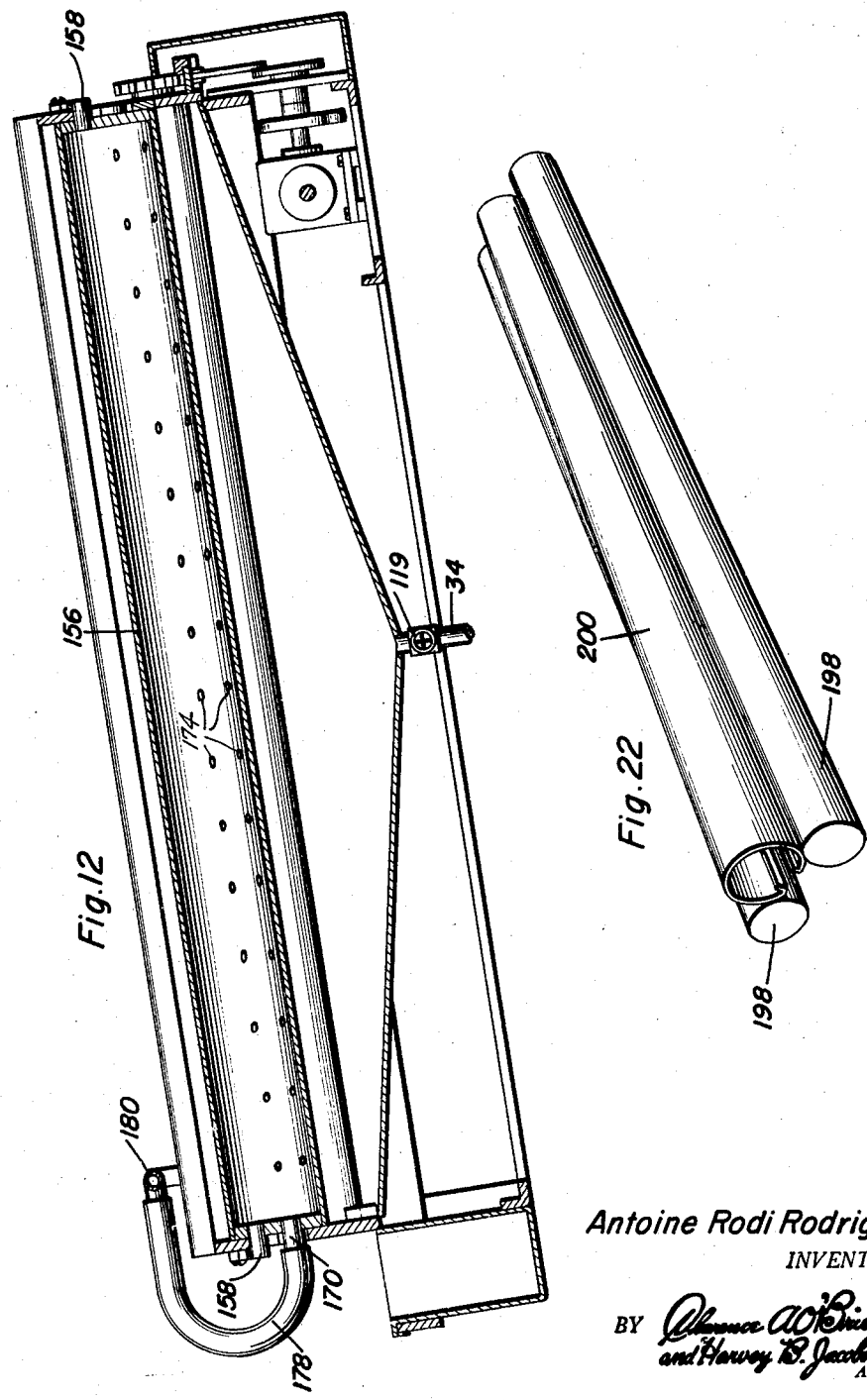

Nov. 4, 1958  A. R. RODRIGUEZ  2,858,563
SEAFOOD PROCESSING MACHINES
Filed Aug. 12, 1954  9 Sheets-Sheet 9

Antoine Rodi Rodriguez
INVENTOR.

United States Patent Office 2,858,563
Patented Nov. 4, 1958

2,858,563
SEAFOOD PROCESSING MACHINES
Antoine Rodi Rodriguez, New Orleans, La.
Application August 12, 1954, Serial No. 449,373
34 Claims. (Cl. 17—2)

This invention relates generally to improvements in seafood processing machines and has for its primary object the provision of improvements therein to effect more rapid processing and to provide machines which will readily and effectively perform their processing functions on different varieties and types of seafood.

Another object of this invention is to provide improvements in seafood processing machines and more specifically in machines of the type for removing the hulls or shells from shrimp, sea prawn, crayfish and the like and which operate by means of a pulling action on the hulls of such seafood so as to effect removal thereof with the least waste and with the maximum of speed.

Still another object of this invention is to provide an improved seafood processing machine in conformity with the foregoing objects in which feed finger or plate mechanisms are embodied which, when taken in conjunction with the novel and improved hulling action, will materially enhance the rapidity and effectiveness of the machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing a seafood processing machine in operative position;

Figure 2 is a view similar to Figure 1 but showing an alternate manner of mounting the individual processing units of the machine;

Figure 3 is an enlarged plan view of one of the seafood processing units;

Figure 4 is a lower or left end elevational view of the unit shown in Figure 3;

Figure 5 is an upper or right end elevational view of the unit shown in Figure 3;

Figure 6 is a longitudinal section taken on an enlarged scale substantially along the plane of section line 6—6 of Figure 3;

Figure 7 is a transverse sectional view of the roller oscillating mechanism and is taken substantially along the plane of section line 7—7 in Figure 3;

Figure 8 is an enlarged sectional view taken substantially along the plane of section line 8—8 of Figure 3;

Figure 9 is an enlarged transverse sectional view taken substantially along the plane of section line 9—9 in Figure 3;

Figure 10 is a plan view of a modified form of processing unit;

Figure 11 is a lower or left end elevational view of the assembly shown in Figure 10;

Figure 12 is a longitudinal section taken on an enlarged scale substantially along the plane of section line 12—12 in Figure 10;

Figure 13 is an enlarged fragmentary elevation of one of the peeling units constructed in accordance with the showing of Figure 10;

Figure 14 is a view similar to Figure 13 but showing the manner of adjustably limiting the oscillatory motion of the individual peeling members of Figure 13;

Figure 15 is an enlarged transverse sectional view of a peeling unit taken substantially along the plane of section line 15—15 in Figure 10;

Figure 16 is a diagrammatic sectional view similar to Figure 15 but showing a still further modified form of construction;

Figure 17 is a fragmentary elevational view showing the manner of mounting the roller members;

Figure 18 is a sectional view through one of the peeling members similar to that of Figure 8 but showing a modification of the embodiment of Figures 3–9;

Figure 19 is a sectional view similar to Figure 18 but showing a modified form of construction of a peeling member;

Figure 20 is a perspective view of one of the redirectory chute members employed in the arrangement of Figure 2;

Figure 21 is a perspective view diagrammatically showing a modified form of construction of the peeling roller unit;

Figure 22 is a perspective view similar to Figure 21 but showing diagrammatically a still further modified form of construction of the peeling roller unit;

Figure 23 is a longitudinal section taken through a modified form of one of the cylindrical roller members;

Figure 24 is an enlarged transverse sectional view taken substantially along the plane of section line 24—24 in Figure 23;

Figure 25:
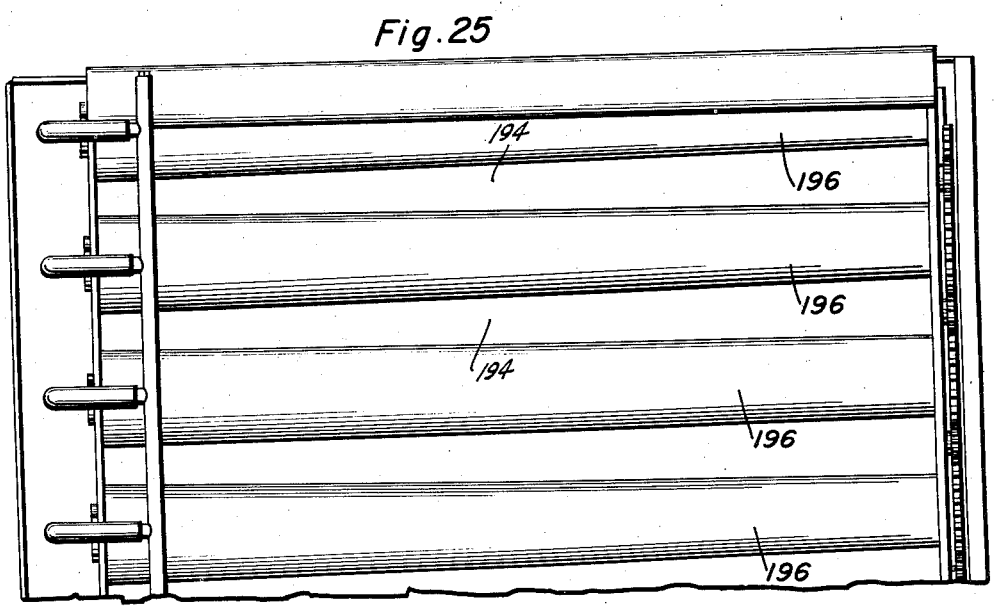
Figure 25 is a plan view showing a portion of a still further modified processing unit of the assembly.

Referring now more particularly to the drawings and most specifically to Figures 1 and 2 the improved processing units are indicated generally by the reference character 10 and are seen to be removably mounted in wheeled supporting frames 12 and 14. The constructional details of the mounting stands 12 and 14 form no part of this invention, suffice it only to say that suitable horizontal support members 16 are provided for supporting the lower ends of the processing unit 10 and that suitable cross brace members 18 are provided for supporting the upper ends of the processing unit, it being understood that the angle of inclination of the processing unit may be adjusted to suit varying conditions. Further, winch mechanism 20 provided with suitable pawl and ratchet mechanisms may be provided for the purpose of varying the angle of inclination of the processing unit.

The assembly shown in Figure 1 utilizes two separate wheeled stand assemblies 12 and 14, this assemblage being utilized where space is not particularly limited whereas the stand assembly 22 shown in Figure 2 may be utilized where the space is extremely limited and in this case two separate winch assemblies 24 and 26 may be provided for the purpose of adjustably varying the inclination of the individual units. Additionally, in the use of the stand 22 as shown in Figure 2, the discharge tray 28 of the upper unit is provided with a corrugated redirectory chute assembly 30, see particularly Figure 20, for the purpose of directing the seafood from the receiver or collector tray 28 of the upper unit to the upper end of the lower unit.

In Figures 1 and 2, reference numeral 32 is utilized to indicate the water inlet line of the individual unit whereas the reference numeral 34 is utilized to indicate the water outlet or discharge line flowing from the individual units.

Referring now more particularly to Figures 3–9, it will be seen that each of the individual units 10, see especially Figure 6, encompasses the use of an open rectangular frame assemblage 36 which includes the upper and lower end wall members 38 and 40, respectively, between which are journalled a series of roller members 42. In this respect, it is to be noted that the upper end of the rollers are provided with projecting shaft portions 44 which extend through and are journalled in the upper end wall 38 and are provided at their extremities with the sprocket members 46. The lower ends of the rollers 42 preferably have their outer surfaces journalled in notched block members 48 secured to the inner surface of the lower end wall 40 for this purpose, the inner surface of the end wall 40 bearing the downward thrust of the individual roller members.

The end walls 38 and 40, as shown best in Figure 3, are rigidly interconnected by the inclined side wall members 50 and 52 and a U-shaped supporting member having spaced leg portions 54 and 56 and an interconnecting bight 58, see Figure 6, forms an extension at the lower end of the frame for removably receiving the collector or receiver tray assembly indicated generally by the reference numeral 60.

Mounted rigidly to the upper and lower end respectively of the processing unit, as shown in Figures 4 and 5, are bearing strap members 62 and 64 respectively which have a portion of their lower edges provided with semi-circular notches to rotatably receive stub shaft members 66 and 68 forming part of the peeling assembly members 70. The members 70 are provided adjacent the opposite ends with depending bracket members 72 rigidly carrying the stub shaft members 66 and 68 by which the depending bracket members and hence the peeling members 70 are pivoted to the end walls 38 and 40, as shown in Figure 6, for oscillatory or rocking movement between the roller members.

It will be noted from Figure 8 that each of the members 70 is of sheet material and of generally C-shaped configuration with transversely curving resilient side portions with their surfaces forming generally a portion of an ellipse and it is to be further noted that the peeling members in effect rest directly upon pairs of adjacent roller members 42.

Rigidly attached as by bracket member 74 along the upper portion of and longitudinally of the peeling members 70 are the water pipe members 76 which are capped as by plug members 78 at their upper ends, see Figure 6, and which are connected at their lower ends by means of flexible tubing 80 to a transversely extending supply pipe member 82 communicating with the pipe 32 previously mentioned, and rigidly carried by any suitable means on the frame of the unit. The individual pipes 76 are provided with apertures 84 on opposite sides thereof, see Figure 8, for directing water into the regions between the rollers 42 and the associated peeling units 70.

The previously mentioned sprockets 46 on the upper end of the journalling shaft 44 for the rollers 42 engage with a rack member 86, see Figure 7, slidably carried by a suitable mounting plate 88 and guide members 90 of the frame of the unit and this rack is given reciprocatory motion by virtue of its connection to the lever 92 carried eccentrically by the rotating disk member 94, the disk being journalled on an axle 96 which also carries a pulley member connected by means of a belt 98 to a drive pulley 100 on the shaft 102 issuing from the gear box 104 which is, in turn, coupled by means of a shaft 106 to a suitable source of power, such as electric motor 108. The drive assemblage is mounted, as shown in Figure 6, on a suitable platform plate 110 disposed beneath the forward end of the unit 10.

Below the rollers and peeling members, see Figure 6, is mounted a refuse tray or trough member 112 which is rigidly secured to the lower edges of the upper and lower end walls and the side wall members 50 and 52, which is V-shaped in longitudinal cross section to provide a trough 114 in its central portion. A discharge pipe member 116, see particularly Figure 9, projects upwardly through the bottom of the trough 112 and is provided with a discharge opening 118 adjacent its upper end for draining water from the tray. This maintains a predetermined level of water within the trough 112, serving to lubricate the lower block member 48 and rubber covered rollers 42. Refuse accumulated may be drained off at the lowest point of the trough at 114 by means of a central valve 119. The pipe 116 is, of course, connected to the previously mentioned discharge line 34.

It will be appreciated that as the disk member 94 rotates, reciprocatory motion will be imparted to the rack 86 which will, impart oscillatory motion to the rollers 42. The rack end of the mechanism may be provided with a suitable cover member 117 to prevent injury to an operator and also to protect the working parts of the unit 10.

Due to the oscillatory motion of the roller members 42, the peeling members which are frictionally engaged therewith are likewise afforded an oscillatory motion. The oscillatory motion of the peeling members 70 will always be opposite in direction to that of the roller members 42. The reason for this will be most readily apparent from a study of Figure 8 of the drawing. Considering a clockwise motion of the roller members 42 in this figure, it will be seen that any seafood resting upon the right hand roller 42 adjacent the contacting portion of the peeler 70 will be tended to be moved away from the peeling member 70, due to the rotation of the rollers 42, whereas motion of the left hand roller 42 in that figure will tend to force seafood between the peeling member and the roller. Thus, it will be readily apparent as shown in dotted lines that both the left hand roller 42 in Figure 8 and the right hand roller will tend to rotate the peeling member 70 in a direction opposite to that of the rollers. Of course, when the rollers 42 are reversed in their rotation, the peeling members will also reverse in their rotation.

It will be noted that the peeling members are formed, in a similar manner to that of Figure 19, with lips 121 at their inner edges such that scraping edges are provided at 121'. In the extreme positions of the peeling members, these scraping edges will contact the rollers 42 and will effectively remove slime and bits of hulls or the like from the rollers. This cleansing action is enhanced by the fact that as normally set up, the rollers 42 will oscillate through a greater degree of arc than will the peeling members, producing a greater or lesser amount of slippage between the peeling members and the rollers at the extreme positions of oscillation. As shown in Figure 8, the C-shaped members 70 have their curved sides extending along the arc of a circle whose radius extends from the axis of the stub shafts 66, 68 to the periphery of the roller members 42, whereby the contact of the peeling members 70 with the roller members 42 will be maintained during relative oscillatory rotation therebetween. The result attained is two-fold, namely, not only are hulls and the like effectively pulled away from the seafood and carried past the stationary peeling members by one of the still moving rollers, that is at one extreme of oscillation, but also the other roller is at the same time being moved past the stationary peeling member such that a cleansed surface portion on the roller is presented above the line of contact of that roller with the peeling member, permitting a good frictional contact between the cleansed roller surface and the peeling member and with seafood disposed therebetween when the direction of rotation is reversed.

Resting upon the water supply pipe members 76 and partially embracing these members are the rocker bar 120. Journalled between the end walls 38 and 40 intermediate each pair of adjacent peeling members 70 are supporting shaft members 122 and each of the latter carry a pair of spaced actuating members 124 which have upwardly projecting finger portions 126 received in notches 128 in the rocker bar 120. The members 124 have depending lower portions 130 straddling and rigidly secured to upper edge portions of the feed plate members 132 such as to be mounted for oscillation with the shaft 122 as the rocker bars 120 are rocked to and fro in response to oscillation of the peeler members 70 in the manner indicated most clearly in Figure 8 of the drawings. The purpose of the feed plates is, of course, to feed or direct the seafood 134 toward that adjacent peeling member of each associated roller with which the peeling action is to take place. It is to be understood that the rocker bar 120 may extend over to and in engagement with all of the peeling members, that is, into contact with the opposite end peeling members 70 as shown for example in Figure 7 as well as those peeling members which are shown to be contacted by such rocker bars.

As shown in Figure 8, the water pipe members 76 of one or more of the peeling members 70 is received in a notch in the lower surface of the rocker bars 120 in order that oscillation of the peeling members by the roller members as hereinbefore set forth may cause transverse reciprocation of the rocker bars 120 and thus effect oscillation of the feed plate members 132.

The elliptical configuration of the peeling members is of extreme importance inasmuch as the constantly changing radius of curvature thus presented by the surfaces of the peeling members insures an extremely efficient gripping action at the start of the peeling action or when the free edge of the peeling member is closest to the line of contact with the roller member inasmuch as the included angle between the peeling member and the roller will be, at this point, at a minimum to insure the effective gripping of an associated hull or shell. As the peeling process continues while the peeling member and the roller oscillate, the included angle between the peeling member and the roller becomes larger and larger to permit the enlarged body portion of the seafood to be more readily accommodated therebetween. This effect materially enhances both the speed and the efficiency of the peeling operation.

Attention is now directed more particularly to Figures 18 and 19 wherein modified forms of peeling members are shown. In the latter figure, the peeling member 136 is rigidly connected to the water pipe 138 by suitable bracket members 140 which impart relative rigidity to the peeling members. In contrast to this, the assembly shown in Figure 18 is connected to the water pipe 142 either by very small bracket members or by directly welding the water pipe to the peeling member 144 in the region of the area indicated by the reference character 146. A pair of L-shaped bracket members 148 and 150 have their shorter legs rigidly affixed to the outer surface of the peeling member 144 with their longer legs upstanding and provided with suitable apertures through which a bolt member 152 projects. By clamping on the bolt and its associated nut 154, the free edges of the peeling member may be spread apart to vary the angle of contact with the associated rollers. This is extremely beneficial in those cases wherein many varieties or sizes of seafood are encountered and are to be processed by the same unit.

A further means of enhacing the peeling operation resides in the provision of stop sleeve members 172', see Figures 3, 5 and 8, in surrounding relation to the water pipe members 76 immediately above the bearing members 62. By varying the outside diameter of the sleeves 172', the amount of oscillation which can be imparted to the peeling members may be varied and in this respect it is to be noted that limiting the oscillatory arrangement of the peeling members to a very little amount will effect a prolonged skidding or scuffing action between the associated rollers and the peeling members which is extremely effective in removing stubborn hulls or shells.

It is to be further understood that the rocker bars 120 are of sufficient weight to properly produce their desired result by merely resting upon the upper surfaces of the water pipes 76, no further securement being needed between the water pipes and the rocker bars. Furthermore, suitable abutment members are to be formed in radially projecting relation to the water pipes to prevent longitudinal shifting of the rocker bar therealong. Of course, the rocker bars may be driven, mounted or supported by other equivalent means other than that specifically shown and described, so long as the principles of operation as hereinabove set forth are adhered to.

Referring now more particularly to Figures 10–15 wherein a modified form of construction is shown, it is to be understood that the construction of the unit shown for example in Figure 10 is in all respects similar to the construction previously described with the exception that the peeling members 156 are of different construction. As will be seen most clearly in Figures 12–14, the peeling members 156 are provided at their opposite ends with projecting stub shafts 158 which are eccentrically located with respect to the center of the ellipse and it will be further seen that these stub shafts are received in the notched portion 160 of the bearing members 162 which are rigidly affixed to the opposite end walls of the unit. A spring member 164 is fixed to the bearing member 162 in association with each stub shaft 158 by any suitable means such as hooking an eye-end portion around a post 166 and abutting the opposite end against a pin 168 as shown in Figures 13 and 14, the purpose of these spring members being to effectively damp out vibrations which may tend to occur in the peeling members 156. In this respect, it is to be noted that the eccentric mounting of the peeling members will effect a transverse shifting of the stub shaft 158 as the rollers 42 are rotated, this action being shown most graphically in Figure 14 in the full and dotted line positions of the peeling members. For limiting oscillatory motion of the peeling members 156, they are provided at opposite ends with stop pin members 170 for striking against the upper edge of the associated walls 38 and 40. As will be seen most clearly in Figure 14, these pins 170 may be provided with various sized sleeve members 172 to vary the oscillatory motion permitted of the peeling members 156. These sleeves or ferrules are easily removed from and slipped onto the pins 170 for the purpose of obtaining more or less scuffing or slippage between the peeling members and the rollers, by limiting, more or less, the oscillatory motion which the peeling members may described. The desired action is best suited for various types and sizes of seafood, as dictated by actual test or experience.

Likewise, the other forms of the invention may be provided with similar motion limiting sleeves, as for example, the sleeves 172' shown on the pipe member 76 in Figures 6–8.

Figures 12 and 15 illustrate more clearly the construction of the peeling members 156 wherein it is to be noted that they are provided with a pair of apertures 174 adjacent each side thereof above and below the point of contact between the peeling members and the associated rollers 42. An inlet pipe 176 is secured to the lower end of each peeling member for connection through a suitable flexible coupling element 178 to the water supply pipe member 180 and it will be readily apparent that this construction permits flushing of the rollers 42 both above and below the line of contact between the peeling members and the rollers.

Although they are not shown specifically in Figures 10 through 15, it is to be understood that the modified mechanism shown therein is equall well adapted for use in conjunction with feed plate members, such as the members 132 previously described, these elements being omitted for the sake of clarity from Figures 10-15. Their use is, of course, optional as is their use with the form of the invention shown in Figures 3-9. However, in either form of the invention thus far described, feed plate members will materially enhance the rapidity and effectiveness of the peeling operation.

Reference is had now more particularly to the diagrammatic showing in Figures 16 and 17 where a still further modified form of construction is shown. In this respect, it is to be noted that the assemblies shown embody the hollow elliptical peeling members 157 similar to the members 156 previously mentioned but that a pair of roller members 176 are loosely mounted in the end walls 38 and 40 for reception therearound of the endless belt member 178.

The rollers 176 are provided at their opposite ends with projecting stud shaft members 180 journalled in bearing block members 182 slidably received in the mutually divergent notches 184 in the associated end walls 38 and 40. A fixed idler roller 186 is journalled rigidly in the unit and contacts the bottom flight of the belt 178 intermediate the rollers 176 to effectively maintain the belt over each roller in taut condition. This, taken in conjunction with the spreading action attained by the mutually divergent notches 184 will preclude dragging of the belt member 178. The spring members 188 may be provided between the plate members 190 and the undersurfaces of the bearing blocks 182 such that the bearing blocks are resiliently mounted within the notches 184 and it is to be noted that the thumb screw members 192 engage against the undersurfaces of washer members 190 for effecting manual adjustment of the mounting of the roller members 176.

The assemblies shown in Figures 16 and 17, like the modification shown in Figures 10-15, may or may not be utilized in conjunction with the feed plate member as previously set forth.

Referring now more particularly to Figure 21 wherein the modified form of the assemblage is shown, it will be seen that this modification contemplates the provision of a pair of cylindrical roller members 194 cooperating with a conically shaped peeling member 196 such that due to the disparity between the circumference of adjacent sections of the peeling member, scuffing and scrapping or peeling actions through the entire length of the peeling members, results.

Similarly, the assemblage shown in Figure 22 embodies the cylindrical roller members 198 operating in conjunction with a conically shaped peeling member 200 which is generally of C-shaped configuration in cross section but which forms a portion of a circle.

The assemblage shown in Figure 25 of the drawings illustrates the use of the conically shaped peeling members 196 illustrated in Figure 21 of the drawings. It is to be noted that the utilization of the conical peeling members in the manner shown in Figure 25 will effect a large included angle at the upper end of the unit which decreases progressively toward the lower end thereof such that initiation of the peeling operation is most effectively produced at the upper end of the unit by permitting the relatively large body of the seafood product to be disposed closely adjacent to the line of contact between the rollers and the peeling members.

Figure 26:
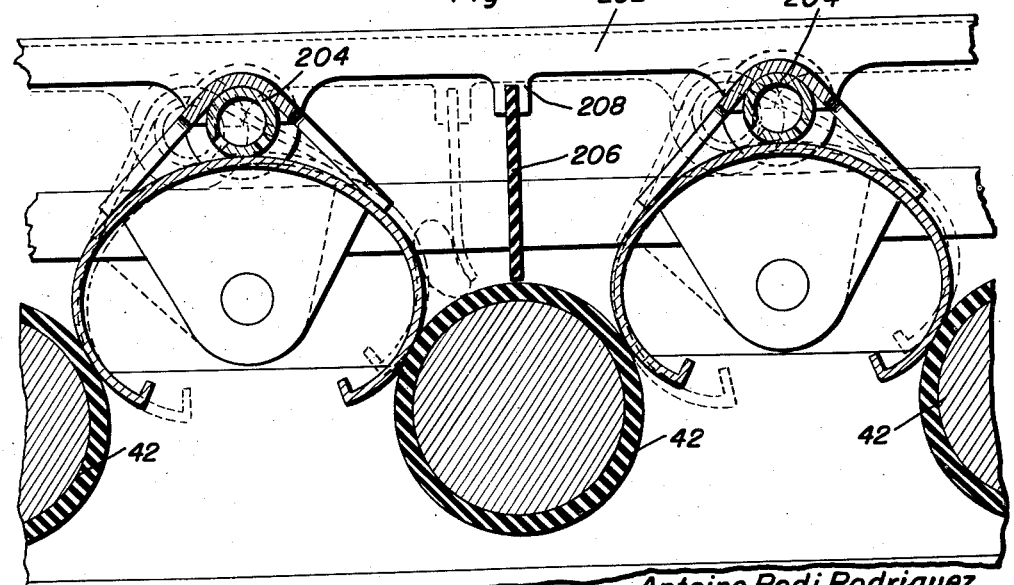
Figure 26 is an enlarged vertical transverse sectional view of the peeling unit similar to Figure 8 but with a slightly modified feed plate.

The assemblage shown in Figure 26 of the drawings is similar in all respects to the assemblage described in connection with Figures 3-10 with the exception that the rocker member 202, though mounted on the water supply pipe 204 in the same manner as previously described, carries the laterally shiftable feed plate members 206 directly by virtue of depending bifurcated portions 208 engaging the upper edge of the feed plate 206. In all other respects, the assemblage shown in Figure 26 is the same as that shown in Figure 3, for example.

Referring now more particularly to Figures 23 and 24 wherein a preferred form of cylindrical roller member is shown, it will be seen that the roller member is formed of two half sections 210 and 212 which, when fitted together, form a complete cylinder. Centrally disposed on the sections 210 and 212 are the overlapping bearing portions 214 and 216, which respectively prevent the longitudinal displacement between the halves. Further, the sections 210 and 212 are provided with aligned wall sections 218 and 220 respectively which are notched to receive wedges 222 on the wedge bar 224. The outer ends of the wedge bars 224 are threaded and receive nut members 226 whose manipulation effects projection of the wedges 222 into the notches formed in the wall sections 218 and 220 to effectively spread the sections 210 and 212 apart. This manner of constructing the roller members obviates the necessity of expensive coating processes for coating the rollers with rubber, either synthetic or natural, for in this manner a rubber sleeve member 228 may be slipped around the cylinder sections 210 and 212 when they are in a relatively collapsed state whereafter manipulation of the nut members 226 will effect spreading of the sections 210 and 212 against the interior surface of the sleeve 228 such that the latter is effectively gripped thereby. The spreading apart of the sections 210 and 212 continues until the end plug members 230 and 232 are suddenly received within the opposite ends of the cylinders thus formed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A seafood cleaning machine comprising a support frame, a pair of roller members, means on said support frame supporting said roller members for rotation in a plane in side-by-side relation, means operatively connected to said roller members and imparting rotary oscillation thereto about their axes, a peeling member disposed between said pair of roller members, means on said support frame mounting said peeling member for oscillatory rocking movement about an axis which is disposed in side-by-side relation with and between those of said roller members, said peeling member having flexible surfaces, portions of which lie at different distances from the axis of rotary oscillation of said peeling member and in operative engagement with both of said roller members whereby oscillations of the latter will impart a rocking movement to the former.

2. The combination of claim 1 including stop means operatively connected to said peeling member for limiting the oscillatory movement of the latter.

3. The combination of claim 2 including a feed plate, means on said support frame mounting said feed plate adjacent one of said roller members and said peeling member for pivotal swinging movement toward and from said peeling member, means operatively connected with said feed plate and causing swinging of the latter whereby to move shrimp on the roller member to said peeling member.

4. The combination of claim 3 including a connecting means operatively connected to said feed plate and to said peeling member to thereby cause swinging movement of the former in timed relation to rocking movement of the latter.

5. The combination of claim 4 wherein said mounting means for said feed plate includes a rocker bar, means on said rocker bar supporting said feed plate, said connecting means being connected to said last mentioned means.

6. The combination of claim 5 wherein said connecting means includes a bar extending transversely across said roller and peeling members, said bar having a connection with said feed plate mounting means.

7. A seafood cleaning machine comprising a plurality of roller members, means supporting said roller members for rotation in a plane in side by side relation, means operatively connected to said roller members and imparting rotary oscillation thereto about their axes, a plurality of peeling members each disposed between a pair of adjacent roller members, means operatively associated with said roller supporting means and mounting said peeling members for oscillatory rocking movement about axes disposed in side-by-side relation with and between the axes of said roller members, said peeling members each having flexible surfaces disposed eccentrically of the axes of rotation of its peeling member, said surfaces being in operative engagement with both of the adjacent roller members whereby oscillations of the latter will impart a rocking movement to the former.

8. The combination of claim 7 wherein said surfaces of said peeling members maintain a constant and uninterrupted engagement with said adjacent roller members.

9. The combination of claim 7 including a plurality of feed plates, mounting means pivotally supporting each feed plate between a pair of adjacent members for swinging movement laterally between the latter, means operatively connected to said feed plates and said peeling members and causing swinging movement of the former relative to the latter.

10. The combination of claim 7 including a plurality of feed plates, mounting means pivotally supporting each feed plate between a pair of adjacent members for swinging movement laterally between the latter, means operatively connected to said feed plates and said peeling members and causing swinging movement of the former relative to the latter, said last mentioned mounting means comprising rocker bars disposed parallel to the peeling members, said feed plates being pivotally supported upon said rocker bars.

11. The combination of claim 7 including a plurality of feed plates, mounting means pivotally supporting each feed plate between a pair of adjacent members for swinging movement laterally between the latter, means operatively connected to said feed plates and said peeling members and causing swinging movement of the former relative to the latter, said last mentioned mounting means comprising rocker bars disposed parallel to the peeling members, said feed plates being pivotally supported upon said rocker bars, said connecting means comprising rocker bars each operatively connected to said peeling members and said feed plates.

12. The combination of claim 7 wherein said peeling members are C-shaped in cross section.

13. The combination of claim 7 wherein said peeling members are of elliptical configuration.

14. A seafood cleaning machine comprising a plurality of oscillatable, elongated members, means supporting said elongated members for oscillation about their elongated axes and with the latter disposed in side by side fixed relation, means operatively connected to said oscillatable members and oscillating them about said axes, a plurality of elongated peeling members each disposed between a pair of adjacent oscillatable members, means mounting said peeling members for oscillation about stationary longitudinal axes disposed in side by side relation with the axes of said oscillatable members, each peeling member being of sheet material with transversely curving resilient portions, each resilient portion engaging one of said adjacent oscillatable members whereby said peeling member will be given a rocking movement upon oscillation of said oscillatable members and each peeling member and the engaged oscillatable member will form a resilient crotch.

15. In a shrimp cleaning apparatus, a peeling unit comprising an elongated roller forming a base member and mounted for oscillatory rotation about a longitudinal axes, a pair of elongated peeling members mounted for oscillation about longitudinal axes parallel to said longitudinal axis, each of said peeling members being of sheet material and having a transversely curving resilient portion, the resilient portions of said pair of peeling members resiliently engaging opposite portions of said base member and forming therewith a pair of resilient peeling crotches, said peeling and base members having frictional engagement whereby oscillation of one member will effect oscillation of the other members.

16. The combination of claim 14 including a plurality of elongated feed members, means mounting each feed member between a pair of adjacent peeling members and adjacent the oscillatable member associated with the latter for movement toward and from said resilient crotches whereby to urge seafood into the latter and means operatively associated with said feed members and causing rocking movement thereof.

17. The combination of claim 15 including an elongated feed member, means mounting said feed member between said pair of adjacent peeling members and adjacent said oscillatable member for movement toward and from said resilient crotches whereby to urge seafood into the latter and means operatively associated with said feed member and causing rocking movement thereof.

18. In a shrimp cleaning apparatus, a peeling unit comprising an elongated roller forming a base and mounted for oscillatory rotation about its longitudinal axis, an elongated peeling member of sheet material having a transversely curving flexible portion engaging said roller and mounted for oscillation about a longitudinal axis which is in side by side relation and lies in the same general direction as the axis of said roller, an elongated plate-like feed member extending in the same general direction as that of the base and peeling member, means supporting said feed member for reciprocatory motion transversely of said base and peeling member, said base and peeling member having engagement providing a resilient shrimp peeling crotch therebetween, said feed member urging shrimp into said crotch by its movement towards said crotch.

19. The combination of claim 18 including means associated with said transversely curving flexible portion for varying its eccentricity to the longitudinal axis of rotation of said peeling member.

20. A seafood cleaning machine comprising a pair of oscillatable elongated members, means supporting said elongated members in side by side relation for oscillation about spaced longitudinal axes, means operatively connected to said oscillatable members and oscillating them about said axes, an elongated peeling member disposed between said oscillatable members, means mounting said peeling member for oscillation about a stationary longitudinal axis disposed in side by side relation with the axes of said oscillatable members, said peeling member being of sheet material with transversely curving resilient portions each engaging one of said oscillatable members and forming therewith a resilient crotch, said engagement effecting rocking movement of said peeling member upon oscillation of said oscillatable members.

21. The combination of claim 20 including means operatively associated with each oscillatable members for returning shrimp moved away from the resilient crotch to the latter.

22. The combination of claim 20 including a pair of feed members each operatively associated with an oscillatable member and movable toward and from said peeling member whereby to return to said resilient crotches shrimp moving therefrom.

23. The combination of claim 14 wherein said rollers are of cylindrical configuration, said peeling members being of conical configuration.

24. The combination of claim 1 wherein said peeling member is of C-shaped cross section and formed of resilient material.

25. The combination of claim 14 wherein said rollers are of cylindrical configuration, said peeling members being of conical configuration, and a plurality of feed plates carried by said peeling members for movement laterally with respect to the rollers, said feed plates being disposed parallel to and between adjacent peeling members.

26. The combination of claim 14 wherein said rollers are of cylindrical configuration, said peeling members being of conical configuration, including rocker bars carried by said peeling members adjacent said end walls, said rocker bars being mounted on said peeling members eccentrically of the pivotal axes thereof, a plurality of rocker rods fixed to and extending between said end walls intermediate each pair of adjacent peeling members, and a feed plate pivotally mounted on each of said rocker rods, said feed plates being connected to said rocker bars for movement therewith.

27. The combination of claim 14 wherein said rollers are of cylindrical configuration, said peeling members being of conical configuration, a plurality of feed plates fixed to and depending from said rocker bars, said feed plates being disposed intermediate and in parallelism with each pair of adjacent peeling members.

28. The combination of claim 1 wherein said roller members are of cylindrical configuration, said peeling member being of C-shaped cross section and formed of resilient material, and a feed plate carried by said peeling member for movement laterally with respect to the rollers, said feed plate being disposed parallel to said peeling member.

29. The combination of claim 7 wherein said peeling members are of C-shaped cross section and formed of resilient material, rocker bars carried by said peeling members, said rocker bars being mounted on said peeling members eccentrically of the pivotal axes thereof.

30. The combination of claim 14 wherein said rollers are of cylindrical configuration, said peeling members being conical and of C-shaped cross section and formed of resilient material, and a plurality of feed plates carried by said peeling members for movement laterally with respect to the rollers, said feed plates being disposed parallel to and between adjacent peeling members.

31. The combination of claim 14 wherein said rollers are of cylindrical configuration, said peeling members being of C-shaped cross section and formed of resilient material, including rocker bars carried by said peeling members between said end walls, said rocker bars being mounted on said peeling members eccentrically of the pivotal axes thereof, a plurality of rocker rods fixed to and extending between said end walls intermediate each pair of adjacent peeling members, and a feed plate pivotally mounted on each of said rocker rods, said feed plates being connected to said rocker bars for movement therewith.

32. The combination of claim 14 wherein said rollers are of cylindrical configuration, said peeling members being of C-shaped cross section and formed of resilient material, a plurality of feed plates fixed to and depending from said rocker bars, said feed plates being disposed intermediate and in parallelism with each pair of adjacent peeling members.

33. The combination of claim 14 wherein endless belts are trained about pairs of adjacent rollers, said peeling members engaging said belts.

34. The combination of claim 33, said peeling members being of elliptical configuration.

References Cited in the file of this patent

UNITED STATES PATENTS

| | | |
|---|---|---|
| 848,497 | Ruse | Mar. 26, 1907 |
| 876,802 | Hettrich | Jan. 14, 1908 |
| 2,429,828 | Lapeyre et al. | Oct. 28, 1947 |
| 2,537,355 | Lapeyre et al. | Jan. 9, 1951 |
| 2,574,044 | Lapeyre et al. | Nov. 6, 1951 |
| 2,719,555 | Wood | Oct. 4, 1955 |